March 20, 1956  E. P. PLUEDDEMANN  2,739,165
STABILIZATION OF AROMATIC CHLOROSILANES
Filed Feb. 15, 1952
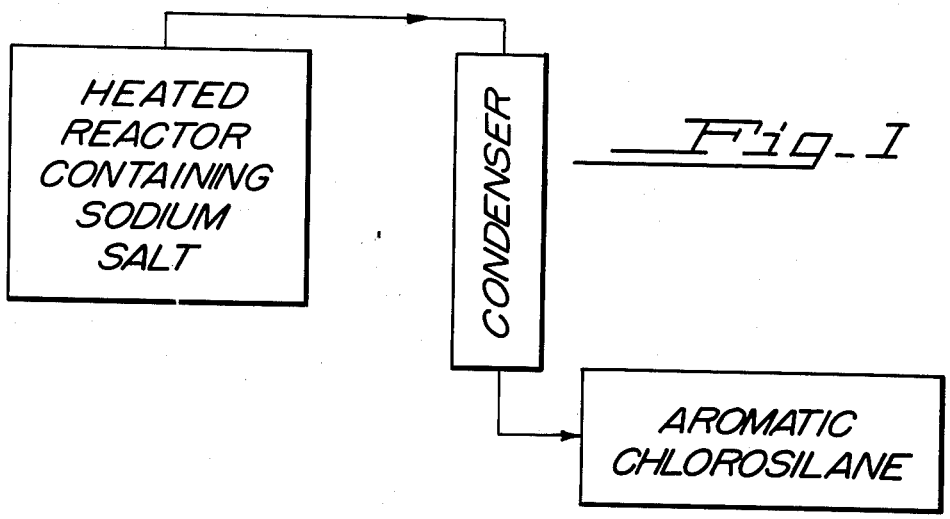
INVENTOR.
EDWIN P. PLUEDDEMANN
BY
Marshall & Marshall
ATTORNEYS

United States Patent Office 2,739,165
Patented Mar. 20, 1956

2,739,165

STABILIZATION OF AROMATIC CHLOROSILANES

Edwin P. Plueddemann, Toledo, Ohio, assignor, by mesne assignments, to Allied Chemical & Dye Corporation, New York, N. Y., a corporation of New York Application February 15, 1952, Serial No. 271,783

13 Claims. (Cl. 260—448.2)

The invention relates to the stabilization of an aromatic chlorosilane in the presence of an aluminum halide.

Aromatic chlorosilanes are important industrial chemicals. They can be produced at a very low cost, but in the processes by which they are so produced, the aromatic chlorosilanes are formed in the presence of an aluminum halide such as aluminum chloride. For example, in the process disclosed by British Patent No. 646,466 phenyltrichlorosilane is produced by reacting benzene with silicochloroform in the presence of aluminum chloride. Similarly, in the process disclosed by U. S. Patent No. 2,576,448 phenyltrichlorosilane is produced by reacting benzene with silicon tetrachloride in the presence of a hydrogen chloride acceptor such as silicon or a metal. When commercial silicon is used as the hydrogen chloride acceptor in the latter process, aluminum chloride is formed from the aluminum that is present as an impurity in the commercial silicon.

The fact that in the commercially important processes for the production of aromatic chlorosilanes, such silanes are formed in the presence of an aluminum halide leads to serious difficulties, because aromatic chlorosilanes are not stable at elevated temperatures in the presence of aluminum chloride or aluminum bromide. The presence of the aluminum halide causes decomposition of the aromatic chlorosilanes during such processes, so as to reduce the yields of the aromatic chlorosilanes and to contaminate them with dark-colored decomposition products. Such decomposition of the aromatic chlorosilanes occurs particularly during the distillation that is necessary in order to separate the crude mixture of reaction products, containing an aluminum halide, that is produced by such processes.

The principal object of the invention is the stabilization at elevated temperatures of an aromatic chlorosilane in the presence of an aluminum halide.

Figure I of the drawings is a diagram illustrating an apparatus for practicing the invention.

Figure II of the drawings is a diagram illustrating another apparatus for practicing the invention.

These specific drawings and the specific description that follows merely disclose and illustrate and are not intended to limit the scope of the invention. More specific objects and advantages are apparent from the description, in which reference is made to the accompanying drawings.

The present invention is based upon the discovery that an aromatic chlorosilane which is in admixture with an aluminum halide can be stabilized against decomposition at elevated temperatures by contacting such mixture with sodium chloride or sodium sulfate. It is believed that the present method minimizes the decomposition of the aromatic chlorosilane by converting the aluminum halide to a complex of the aluminum halide with the sodium salt. It is believed that the conversion of the aluminum halide to such a complex renders the aluminum halide harmless and prevents it from attacking the aromatic chlorosilane.

The present method is remarkably effective in that the presence of the sodium chloride or sodium sulfate greatly retards the decomposition of the aromatic chlorosilane even at relatively high temperatures (probably by holding the aluminum halide in the form of a complex). The present method not only can be used to prevent the aluminum halide from attacking the aromatic chlorosilane, but also is very valuable for use in removing the aluminum halide from the aromatic chlorosilane. The complex formed by the aluminum halide with sodium chloride or sodium sulfate appears to be very stable at or above the boiling points of the aromatic chlorosilanes, so that the aromatic chlorosilanes are readily separated from the complex by distillation. Similarly, separation of an aluminum halide from an aromatic chlorosilane may be effected by passing the vapors through a tower packed with sodium chloride or sodium sulfate or by contacting the vapors with the salt by the fluidization technique. Although the complex of an aluminum halide with sodium chloride or sodium sulfate is a solid at ordinary temperatures, it is a liquid at temperatures above the boiling points of aromatic chlorosilanes so that an aluminum halide can be removed from an aromatic chlorosilane by bubbling the vapors through a column containing the molten complex together with an excess of the salt.

Thus the present method is valuable not only for minimizing the decomposition of an aromatic chlorosilane in the presence of an aluminum halide, but also for facilitating the removal of the aluminum halide. An aluminum halide, because of its solubility and volatility, is ordinarily extremely difficult to remove from an aromatic chlorosilane.

The use of phosphorus oxychloride to remove aluminum chloride from aromatic compounds, by forming a complex with the aluminum chloride, has been proposed. However, the use of phosphorus oxychloride does not provide a satisfactory method of removing an aluminum halide from a chlorosilane because the complex formed by the phosphorus oxychloride with the aluminum halide does not appear to be stable during distillation of the aromatic chlorosilane. When an attempt is made to distill an aromatic chlorosilane containing an aluminum halide and phosphorus oxychloride, some of the aluminum halide seems to distill over with the aromatic chlorosilane. Moreover, phosphorus oxychloride does not prevent the aluminum halide from attacking the aromatic chlorosilane at elevated temperatures. The unsatisfactory results obtained when phosphorus oxychloride is used to remove aluminum chloride from chlorosilanes are evidenced by the formation of low boiling products during subsequent distillation of the chlorosilanes and also by the gradual development of a dark color even after distillation of the chlorosilanes.

The improvement obtained in the practice of the present invention has been demonstrated as follows:

A large sample comprising crude phenyltrichlorosilane containing about 5 per cent by weight of aluminum chloride was concentrated by distilling off materials (such as benzene) boiling at temperatures up to 180 degrees C. A portion (100 grams) of the crude concentrated sample was then refluxed with sodium chloride (5 grams) in a one liter flask for one hour, the maximum reflux temperature and the final reflux temperature being noted. The mixture was then distilled, noting the initial still-head temperature (as the first drop was collected from the condenser), the still-head temperature at the time of collection in the receiver of a total of 50 cc., 55 cc. and 60 cc. of the distillate, and the color (Hellige color comparitor) of the 50 cc. portion of the distillate. These data are recorded in Table 1, below.

For the sake of comparison, the above procedure was repeated using no additive, and was repeated using phosphorus oxychloride (5 grams) as the additive instead of sodium chloride, the results also being included in Table 1.

*Table 1*

[Temperature (° C.)]

| Additive | Max. Reflux | Final Reflux | 1st Drop | 50 cc. | 55 cc. | 60 cc. | Color (Hellige) (50 cc.) |
|---|---|---|---|---|---|---|---|
| None | 185 | 180 | 70 | 217 | residue | charred | black |
| Phosphorus Oxychloride | 195 | 193 | 140 | 207 | 209 | 192 | 6 |
| Sodium Chloride | 195 | 195 | 150 | 210 | 220 | 228 | 5 |

The distillation of aromatic chlorosilanes in the presence of aluminum chloride results in decomposition of the distilland. The formation of low-boiling decomposition products becomes evident as the distillation proceeds when there is a drop in the temperature or the residue chars. This is shown in the results in Table 1 above where, with no additive, the temperature drops from 185 to 180 degrees C. just during refluxing, and the residue chars during the subsequent distillation after the collection of 50 cc. of the distillate. Upon the addition of phosphorus oxychloride, followed by refluxing (to permit the phosphorus oxychloride to react with the aluminum chloride to form a complex), the temperature drops even during the refluxing, and during the subsequent distillation after the collection of 55 cc. of the distillate. Upon the addition of sodium chloride, on the other hand, there is no drop in temperature when the mixture is refluxed (to form a complex of sodium chloride with aluminum chloride), nor does the temperature drop during the subsequent distillation.

It is believed that the incorporation of sodium chloride in a mixture comprising phenyltrichlorosilane and aluminum chloride results in the formation of a stable AlCl₃.NaCl complex so that the phenyltrichlorosilane, uncontaminated with volatile decomposition products, can be separated from the aluminum chloride by distillation under atmospheric pressure as hereinbefore demonstrated. The incorporation of phosphorus oxychloride in a mixture comprising phenyltrichlorosilane and aluminum chloride results, on the other hand, in the formation of a relatively unstable AlCl₃.POCl₃ complex which does not prevent the destructive action at high temperatures of aluminum chloride upon carbon-silicon bonds, as hereinbefore demonstrated. Furthermore, as the results in Table 1 indicate, sodium chloride is more effective than phosphorus oxychloride in preventing the formation of dark color in the distilled chlorosilanes, i. e., sodium chloride is more effective in removing the aluminum halide which causes the formation of dark color.

*Aluminum halide*

An "aluminum halide in which each halogen atom has an atomic weight between 35 and 80" is aluminum chloride or aluminum bromide. The terms "aluminum chloride" and "aluminum bromide" are used herein to mean anhydrous aluminum chloride and anhydrous aluminum bromide.

*Aromatic chlorosilane*

The term "aromatic chlorosilane" is used herein to include arylchlorosilanes and aralkylchlorosilanes.

The term "arylchlorosilanes" is used herein to include silanes having the general formula

or having the general formula

wherein R is a monovalent or divalent aromatic group which can be considered to be derived by the removal of one or two nuclear hydrogen atoms from the molecule of an aromatic compound whose molecule contains from one to three benzene nuclei not more than two of which are condensed, any side chains being not more than three in number and containing a total of not more than six carbon atoms, and any atoms other than carbon and hydrogen consisting of not more than four nuclear halogen atoms having an atomic weight less than 80; Y is a saturated monovalent hydrocarbon radical having from one to six carbon atoms, and having not more than two carbon atoms attached to the carbon atom that is attached to the silicon atom; and x is an integer from 2 to 3.

An aromatic compound from which a group R as defined above may be derived is a substance of the benzene, naphthalene, diphenyl or terphenyl series, having not more than three side chains containing a total of not more than six carbon atoms, any nuclear substituents consisting of halogen atoms each having an atomic weight less than 80 (i. e., chlorine, bromine or fluorine). The side chains, if any, may consist of straight or branched chain primary, secondary or tertiary alkyl groups having from one to six carbon atoms (i. e., any side chains in the molecule of the aromatic compound may be one, two or three methyls or ethyls; one ethyl and one methyl; two methyls and one ethyl; two ethyls and one methyl; either propyl group; two propyl groups; either propyl group and one or two methyls; either propyl group and ethyl; either propyl group, one ethyl, and one methyl; any butyl group and methyl or ethyl; any butyl group and two methyls; any pentyl group; any pentyl group and methyl; or any hexyl group).

The term "saturated monovalent hydrocarbon group having from one to six carbon atoms, and having not more than two carbon atoms attached to the carbon atom that is attached to the silicon atom" is used herein to mean a straight, branched or closed chain monovalent hydrocarbon group having saturated

bonds. A saturated hydrocarbon group having from one to six carbon atoms, which may be attached to a silicon atom in the molecule of a silane used in the practice of the present invention, may be a primary or secondary alkyl group having from one to six carbon atoms (i. e., methyl, ethyl, propyl, isopropyl, butyl, isobutyl, secondary butyl, or any primary or secondary alkyl group having 5 or 6 carbon atoms); or a cycloalkyl group having 5 to 6 carbon atoms (i. e., cyclopentyl or cyclohexyl).

The term "aralkylchlorosilanes" is used herein to include any substance whose molecule consists of a silicon atom to which are attached four monovalent groups, one of which is an aralkyl group; from two to three of which are chlorine atoms; and one of which may be the group Y as hereinbefore defined.

"Aralkyl group" as used herein means a radical consisting of a group Y in which one hydrogen atom has been replaced by a monovalent group R.

Examples of arylchlorosilanes which may be used in the practice of the invention include: phenyltrichlorosilanes, mono-, di-, tri-, tetra- and pentachloro-substituted phenyltrichlorosilanes, diphenyldichlorosilanes, bis (trichlorosilyl) benzenes, bis (trichlorosilyl)biphenyls, biphenyltrichlorosilanes, and alkyl-substituted phenyltrichlorosilanes such as tolyltrichlorosilanes. The most useful of these products are the phenyl- and mono-alkyl-substituted-phenyltrichlorosilanes such as tolyltrichlorosilane, so that the present method is particularly applicable to these chlorosilanes.

Examples of aralkylchlorosilanes which may be used in the practice of the invention include: gammatolylpropyltrichlorosilanes, gamma-tolylbutyltrichlorosilanes, gamma-phenylpropyltrichlorosilanes, tolylcyclohexyltrichlorosilanes, phenylcyclohexyltrichlorosilanes, beta-tolylbutyltrichlorosilanes, beta-tolylpropyltrichlorosilanes, beta-phenylpropyltrichlorosilanes, beta-tolylethylethyldichlorosilanes, alpha-tolylethyltrichlorosilanes, beta-tolylisobutyltrichlorosilanes, alpha - (chlorophenyl)ethyltrichlorosilanes, beta - di(chlorophenyl)ethyltrichlorosilanes, beta-(dichlorophenyl)propyltrichlorosilanes, beta - (dichlorophenyl)ethyltrichlorosilanes and beta - phenylethyltrichlorosilanes.

Arylchlorosilanes (e. g., phenyltrichlorosilane) may be produced by reacting the corresponding aromatic compound (e. g., benzene) with a chlorosilane (e. g., silicochloroform or silicon tetrachloride) in the presence of an aluminum chloride or aluminum bromide catalyst. It is preferred that the molar ratio of the aromatic compound to the chlorosilane reactant be approximately 2 to 1, and that the proportion of the aluminum halide catalyst be between about 0.5 and about 2 mol per cent (based on the amount of the chlorosilane present in the reaction mixture). When the reaction is conducted as a batch operation, a mixture of the silane reactant, the aromatic compound and the catalyst is usually introduced at room temperature into a steel high pressure bomb. The bomb is sealed and placed in a heating jacket, and is then heated at a reasonably rapid rate to reaction temperature. In general, the minimum reaction temperature to obtain a good conversion to arylchlorosilanes, is approximately 300 degrees C. at a reaction time of about four to six hours, and the minimum pressure at the reaction temperature to obtain a good conversion to arylchlorosilanes is about 1000 pounds per square inch gauge.

In the production of arylchlorosilanes by this method in a continuous operation, the reaction zone may comprise a stationary reactor which is heated by any method ordinarily employed (e. g., by electrically heated coils, by a molten salt bath or by flue gases). It is desirable in all instances to avoid the introduction of air, containing moisture, which hydrolyzes the silanes present in the reactor to produce hydrogen chloride. Preferably the catalyst, the chlorosilane reactant and the aromatic compound are introduced directly into the reaction zone, and the products are cooled by means of a condenser connected to the reactor, and are separated by fractional distillation. Aluminum chloride and aluminum bromide exist in the vapor phase under the temperature-partial pressure conditions employed in the production of arylchlorosilanes by this method, so that they may be introduced into the reaction zone by means of an injector, but preferably they are introduced in a stream of the vaporized silane reactant and/or the vaporized aromatic compound, or with an inert gas carrier. Most desirably, the catalyst is dissolved in the liquid reactants before such reactants are vaporized, preheated and introduced into the reactor. Aluminum chloride, unlike aluminum bromide, is not soluble in a liquid aromatic compound such as benzene. It is desirable, therefore, to use aluminum chloride in the form of a complex with a substance such as diethyl ether (usually in a 1:1 molar ratio). That is, the diethyl ether may be dissolved in benzene and then the aluminum chloride added to form the benzene-soluble aluminum chloride diethyl etherate ($AlCl_3.Et_2O$).

The reaction time in such a continuous process is preferably at least twenty minutes and not longer than about two hours. ("Reaction time" with regard to a continuous operation is used herein to mean the average time required for a volume of reactants (calculated at the reaction temperature and pressure) equal to the volume of the reaction zone to pass into a continuous reactor.) The considerations that apply to this method for producing arylchlorosilanes as a continuous operation are the same as those that govern the operating temperature ranges, proportions of ingredients and pressure in the method conducted as a batch process.

If a chlorosilane, having no hydrogen atom attached to the silicon atom, such as silicon tetrachloride or a mixture of silicon tetrachloride with silicochloroform, is reacted with the aromatic compound (e. g., benzene or chlorobenzene) the reaction preferably is conducted in the presence of a hydrogen halide acceptor comprising silicon, as well as in the presence of aluminum chloride or aluminum bromide. The quantity of the aromatic compound used may be in excess of that required to react with the amount of chlorosilane used, in order that the excess aromatic compound may react with the additional silicon tetrachloride generated from the silicon present. When the hydrogen halide acceptor contains aluminum as well as silicon and when its aluminum content is about 1 to 10 per cent by weight (preferably about 5 per cent), it is not necessary to add an aluminum halide catalyst. That is, the aluminum halide catalyst is formed during the reaction between the hydrogen halide and the hydrogen halide acceptor.

Aralkylchlorosilanes may be prepared by reacting the corresponding halo-substituted alkylchlorosilane with an aromatic hydrocarbon in the presence of an aluminum halide catalyst in which each halogen atom has an atomic weight between 35 and 80. In such a reaction the halogen atom is split out of the haloalkyl group in the silane molecule and a hydrogen atom is split out of the aromatic nucleus in the aromatic hydrocarbon molecule so that the two reacting molecules are linked into a single molecule by a carbon to carbon bond. It is preferred that the molar ratio of the aromatic compound to the haloalkylsilane be approximately 3 to 1, and that the proportion of the aluminum halide catalyst be between .75 and 2 mol per cent (based on the amount of the haloalkylsilane present in the reaction mixture). Usually, about ¼ to ⅓ of the total amount of the aluminum halide is added very carefully at room temperature to the mixture of silane and aromatic hydrocarbon, which is then heated for about 20 minutes. The remainder of the aluminum halide is then added in portions large enough to maintain a fairly vigorous rate of reaction, with heating between additions, and after the entire amount of the aluminum halide has been added, the reaction mixture is refluxed for the length of time necessary to complete the reaction and drive off HCl. When the reaction goes rather slowly, the heating may be continued while the remainder of the aluminum halide is added in small portions.

*Stabilizing agent*

The agent with which an aromatic chlorosilane in admixture with an aluminum halide is contacted in accordance with the present method in order to minimize decomposition of the chlorosilane at elevated temperatures is a substance of the class consisting of sodium chloride and sodium sulfate. Of course, any sodium salt which acid group is replaced by chlorine under the conditions employed may be used as a source of sodium chloride. Sodium acetate, for example, which may be converted to sodium chloride in the course of the present procedure, may be used as a source of sodium chloride.

Sodium chloride is the preferred stabilizing agent since it is very economical and convenient to use.

It is preferable in any of the procedures hereinafter described for contacting the aromatic chlorosilane with the stabilizing agent that the proportion of the stabilizing agent be at least equimolar with the proportion of the aluminum halide present, and in order to obtain a very light colored distillate, it is desirable that the proportion of stabilizing agent be at least half the weight of the aluminum halide. It is most desirable that the proportion of stabilizing agent be at least equal to the weight of the aluminum halide. It is believed that an aluminum halide-sodium salt complex actually may be formed when less than one mol of the sodium salt is present per mol of aluminum halide, and in most of the procedures hereinafter described for contacting the mixture of the aromatic chlorosilane and aluminum halide with the sodium salt the proportion of the sodium salt may be as little as one-half mol per mol of the aluminum halide although such proportions are not preferred. However, in the procedure hereinafter described in which the only contact of the sodium salt with the aluminum halide is that which takes place by simply adding the sodium salt to the crude aromatic chlorosilane (containing the aluminum halide) and distilling such mixture to obtain the pure aromatic chlorosilane without first warming and decanting off the precipitated complex the proportion of the sodium salt should be at least equimolar with the proportion of the aluminum halide present, and it is preferable that it be at least one and one-half to two times the weight of the aluminum halide. (If the complex of the aluminum halide with the sodium salt were formed with less than one mol of the sodium salt per mol of the aluminum halide in this contacting procedure, at the relatively high temperature of the distillation the excess of the aluminum halide in the complex might sublime and come over in the distillate. Of course, if the mixture is warmed to form the complex and the complex is removed, e. g., by decantation, from the distilland before it is distilled, most of the aluminum halide, even though it is in the form of a rather loose complex, is removed before the distillation, so that in such a procedure less than one mol of the sodium salt can be used per mol of the aluminum halide present.) For example, when sodium chloride (2 grams) was added to a mixture comprising crude phenlytrichlorosilane (100 grams) and aluminum chloride (5 grams) and the mixture was distilled, the color (Hellige) of the distillate was 10, whereas in a similar run in which a larger proportion of sodium chloride (7 grams) was used, the color (Hellige) of the distillate was 4.

When an aromatic chlorosilane in admixture with an aluminum halide is heated at ordinary atmospheric pressure, decomposition of the silane starts at a temperature of about 130 degrees C. and, if such mixture is heated under reduced pressure, decomposition may start at a temperature as low as about 100 degrees C. In the practice of the invention the decomposition of an aromatic chlorosilane in the presence of an aluminum halide which normally occurs at elevated temperatures is minimized by contacting such mixture with a sodium salt stabilizing agent, as hereinbefore defined. The contacting of such mixture with the sodium salt at a temperature of at least about 60 degrees C. results in a complex of the aluminum halide with the sodium salt. Thereafter the aluminum halide is prevented from attacking the aromatic chlorosilane even at temperatures as high as 400 to 500 degrees C. under the pressures hereinbefore described. Thus, the temperature at which the mixture of the aluminum halide and the aromatic chlorosilane is contacted with the sodium salt should be at least about 60 degrees C. although it is preferable that it be at least about 70 degrees C. and it is most desirable that it be at least about 93 degrees C.

When an arylchlorosilane is produced at a relatively low pressure, e. g., at a pressure below about 700 pounds per square inch gauge, under the temperature conditions hereinbefore described, some decomposition may occur during the reaction by which the silane is produced, thus causing the yield of the silane to be low. When the arylchlorosilane is produced under relatively low pressure, it is desirable that the contacting of the arylchlorosilane (in admixture with an aluminum halide) with the sodium salt take place during the formation of the arylchlorosilane, by forming the silane in the presence of the aluminum halide and the sodium salt.

For example, an aluminum halide that is to be employed as a catalyst in the production of an arylchlorosilane may be heated, before it is introduced into the reactor, with a sodium salt stabilizing agent to form a sodium salt-aluminum halide complex which may be introduced in the reactor (preferably along with an excess of the sodium salt, as hereinafter further discussed) before the reactants are introduced. Thus, as disclosed on pages 31 and 32 of my copending application Serial No. 169,302, filed June 21, 1950, a reactor may be initially filled one-half to three-quarters full with solid lumps of such a complex, and an aromatic hydrocarbon and a silane reactant may be passed through the complex during the reaction, as illustrated in Figure I. A complex such as sodium aluminum chloride is melted at the reaction temperature so that the aromatic compound and the silane reactant may be bubbled through the complex during the reaction to produce an aromatic chlorosilane. It is preferable to use porous clay Raschig rings or pieces of porous porcelain impregnated with the complex. For example, the complex can be heated to a liquid condition and then poured into a reactor containing the Raschig rings or pieces of porous porcelain for absorbing the complex. The considerations that apply to a continuous operation during which the catalyst is retained in the reactor in the form of a sodium salt-aluminum halide complex are the same as those hereinbefore described that govern the operating temperature ranges, proportions of ingredients and pressure in a continuous operation in which the aluminum halide catalyst is introduced into the reactor along with the reactants.

Thus, in one embodiment of the present method the decomposition of an aromatic chlorosilane in admixture with an aluminum halide is minimized by contacting the aromatic chlorosilane with sodium chloride or sodium sulfate under such conditions that all of the aluminum halide present is in the form of a complex with at least part of the sodium salt.

In some cases a column containing a molten sodium salt-aluminum halide complex may serve as a reactor, but the column should be maintained under sufficient pressure that a good yield of arylchlorosilanes can be obtained. For example, as disclosed on page 23 of my copending application Serial No. 169,302, when a mixture of equimolar proportions of silicochloroform and benzene was bubbled through a molten sodium aluminum chloride complex ($AlCl_3, NaCl$), at atmospheric pressure, no reaction took place at a temperature of 340 to 360 degrees C., and only when the temperature was increased to 400 degrees C. was a small quantity of arylchlorosilanes recovered. In contrast, when such a mixture of benzene and silicochloroform was reacted in the presence of 7 per cent of molten $AlCl_3, NaCl$ for five hours in a bomb at superatmospheric pressure at a temperature of about 320 to 340 degrees C., about a 70 per cent conversion to arylsilanes was obtained.

Although an arylchlorosilane may be formed in the presence of an aluminum halide-sodium salt complex that is initially introduced into the reactor as such, it is often more convenient to form the complex in the presence of the arylchlorosilane. That is, the complex may be formed in the presence of the arylchlorosilane during the formation of the arylchlorosilane, or, in still another embodiment of the invention, the complex may be formed in the presence of the arylchlorosilane after the chlorosilane is produced.

In the practice of the invention the mixture of the arylchlorosilane and the aluminum halide may be contacted with the sodium salt stabilizing agent at any time from the time when the arylchlorosilane is formed (e. g., by having the stabilizing agent present at some point in the reactor) to the time when the aromatic chlorosilane products are separated from the reactants by distillation (e. g., by adding the stabilizing agent to the distilland during the distillation, as hereinafter further discussed). The time when such contact is most advantageously made depends primarily upon the reaction pressure at which the arylchlorosilane is produced; the lower the pressure, the sooner contact is desirable in order to minimize decomposition of the arylchlorosilane, as hereinbefore discussed.

In order to obtain early contact with the sodium salt when arylchlorosilanes are produced at relatively low pressures and when the aluminum halide-sodium salt complex is formed in the presence of the arylchlorosilane, the sodium salt should be present in the reactor in which the arylchlorosilane is formed, as shown in Figure I. For example, in the production of an arylchlorosilane by the procedure which consists in passing a vaporized and preheated silane reactant (e. g., silicon tetrachloride) and an aromatic compound through a reactor packed with a hydrogen halide acceptor which comprises silicon (preferably the silicon contains sufficient aluminum that it is not necessary to pump additional aluminum halide catalyst through the reactor), the sodium salt stabilizing agent may be dispersed in the finely divided silicon and the reaction carried out by, e. g., the fluid-bed reaction technique, which permits good contact of the vaporized arylchlorosilane with the sodium salt and the aluminum halide-sodium salt complex that forms. Alternatively, a silane reactant, an aromatic compound and an aluminum halide catalyst may be pumped into the top of a reactor which is packed at the botom with the sodium salt.

When the arylchlorosilane is produced under a reaction pressure higher than about 700 pounds per square inch gauge, e. g., about 1000 pounds per square inch gauge, there is less danger of decomposition during the reaction, and it is not necessary to having the stabilizing agent present during the formation of the arylchlorosilane, so that the arylchlorosilane may be produced and then contacted with the stabilizing agent, as shown in Figure II. For example, arylchlorosilanes may be produced by any of the procedures hereinbefore described by passing a vaporized silane reactant, an aromatic compound and a catalyst through a reactor (alternatively an aluminum halide catalyst may be formed in the reactor from aluminum that is contained in silicon that is initially present in the reactor) and then the vapors of the product may be passed through the sodium salt stabilizing agent, as shown in Figure II. Preferably, such sodium salt is present in a heated column containing an aluminum halide-sodium salt complex in molten form together with an excess of the sodium salt. Excellent contact of the arylchlorosilane vapors with the sodium salt can be obtained in such a column, but, of course, the aluminum halide-sodium salt complex may be formed in the presence of the arylchlorosilane by simply passing the vapors of the product as they leave the reactor through a contact tower or salt pot, packed with the sodium salt, that connects the reactor to the condenser.

The present method not only stabilizes an aromatic chlorosilane in admixture with an aluminum halide against attack by the aluminum halide at elevated temperatures, but is also useful in separating the aromatic chlorosilane from the aluminum halide. (The presence of even small amounts of an aluminum halide in an aromatic chlorosilane causes undesirable discoloration.) It is preferable to conduct such separation by removing the aromatic chlorosilane from the sodium salt stabliizing agent (i. e., from the complex of the aluminum halide with the sodium salt) in the form of a vapor.

In the methods hereinbefore described for contacting the vapors of an arylchlorosilane (in admixture with an aluminum halide) with a sodium salt, at least part of the aluminum halide is separated from the silane in the form of a complex with the sodium salt. For the most part such complex is left behind in the reactor or contact tower by the vapors of the arylchlorosilane product, so that essentially the silane product is removed from the complex in the form of a vapor. In some cases small amounts of the complex may contaminate the silane product, but these small amounts (or, in fact, even large amounts) have no harmful effect on the arylchlorosilane product if the liquid product is then purified by distillation, the relatively inert, non-volatile complex being left in the distillation residue. Since the aluminum halide-sodium salt complex is a solid when cool, it may be substantially removed from the cooled liquid product by filtration or by decanting the liquid from the solid, before the product is purified by distillation. Preferably, in order to insure colorless aromatic chlorosilanes, i. e., to insure the removal of all of the aluminum halide, a small additional amount of the sodium salt is added to the decanted liquid layer before it is distilled.

When the aromatic chlorosilanes are produced under reasonably high pressures (e. g., about 1000 pounds per square inch gauge), the only contact with the sodium salt stabilizing agent that is ordinarily necessary is that which takes place after the silane is produced when the liquid product is fractionally distilled (in the presence of the sodium salt) to separate the aromatic chlorosilanes from the reactants.

If desired, the sodium salt may be added to the crude mixture comprising the aromatic chlorosilane and the aluminum halide and the mixture may be distilled in the ordinary manner. It is beneficial, however, in obtaining a light colored distillate, to first warm the aromatic chlorosilane mixture with the sodium salt at a temperature of at least 60 degrees C. and preferably about 95 degrees C. until the aluminum halide forms a complex with the sodium salt, and then to decant the liquid from the precipitated complex. A small additional amount of the sodium salt (e. g., just a trace, or about 0.1 per cent by weight) preferably is added to the liquid residue before it is distilled. This procedure is most conveniently carried out by adding the sodium salt to the crude mixture comprising the aromatic chlorosilane and the aluminum halide and distilling off the lights, i. e., the low boiling materials such as unreacted starting materials. The distillation residue may then be decanted from the complex formed during this time, and the liquid residue may be placed in a smaller, clean vessel along with a trace of the sodium salt before continuing the distillation to obtain the desired products.

When the aluminum halide is first partially separated in the form of a complex from the liquid to be distilled and the liquid is then distilled in the presence of a small amount of a sodium salt, the complexing agent may be phosphorus oxychloride instead of sodium chloride or sodium sulfate. For example, as disclosed in my copending applications Serial Nos. 169,302 and 210,160, an amount of phosphorus oxychloride equivalent to the amount of aluminum chloride present in the reaction mixture (or in slight excess over the amount of aluminum chloride) may be added to the reaction mixture. The insoluble $AlCl_3 \cdot POCl_3$ complex may then be filtered from the solution, or the liquid to be distilled may be decanted from the mixture, leaving a residue containing the $AlCl_3 \cdot POCl_3$ complex.

An excess of sodium chloride may then be added to the filtrate so that any residual aluminum chloride is converted to the non-volatile and relatively inert complex $AlCl_3 \cdot NaCl$. Ordinarily an amount of sodium chloride that is equivalent to the amount of aluminum chloride originally present in the reaction mixture may be added. Although such a procedure results in a larger excess of sodium chloride than is necessary (since most of the aluminum chloride is removed in the form of the $AlCl_3 \cdot POCl_3$ complex), the presence of the excess sodium chloride has no harmful effect and its granular form even aids in the distillation.

The method of the invention may be carried out in accordance with the procedures described in the following examples, of which Examples 2, 3, 5, 6, 7 and 8 are set forth in my copending applications Serial Nos. 169,302 and 210,160.

*Example 1*

A crude mixture (200 grams) of tetrachlorophenyl-trichlorosilanes containing about 10 grams of aluminum chloride is mixed with sodium chloride (10 grams) in a distillation flask. The mixture is then distilled under reduced pressure to yield a light colored clear distillate boiling within the range between 125 and 220 degrees C. at 15 mm. Hg.

*Example 2*

A crude mixture of ethylphenyltrichlorosilanes containing about 13 grams of aluminum chloride is placed in a distillation flask with sodium chloride (10 grams) and is fractionally distilled through a jacketed glass column 36 inches in length, packed with single-turn glass helices. After distilling off the lower boiling materials (e. g., the materials boiling in a range up to about 150 degrees C.), the residue is cooled and decanted into a clean flask. The distillation is then continued to yield a light colored clear product comprising ethylphenyltrichlorosilanes (50 grams, B. P. 220–250 degrees C.). (Unless otherwise specified, the boiling ranges given herein are at approximately atmospheric pressure, i. e., 740 to 755 mm. Hg.)

*Example 3*

A crude mixture (50 grams) comprising ethylphenyldichlorosilanes and about 13 grams of aluminum chloride is mixed with sodium chloride (10 grams), and the mixture is then distilled to yield a light colored clear liquid boiling in a range up to 250 degrees C.

*Example 4*

A crude mixture comprising tolyltrichlorosilanes (1800 grams) and about 26 grams of aluminum bromide is mixed with sodium chloride (10 grams). The mixture is then fractionally distilled to yield a light colored clear product (30 grams) comprising tolyltrichlorosilanes (B. P. 205–240 degrees C.).

*Example 5*

A crude mixture comprising tolyltrichlorosilanes and about 13 grams of aluminum chloride is mixed with sodium chloride (10 grams) in a distillation flask. The mixture is then fractionally distilled to yield a light colored clear product (130 grams) comprising tolyltrichlorosilanes (B. P. 223–228 degrees C.).

*Example 6*

A crude mixture comprising phenyltrichlorosilane and about 26 grams of aluminum bromide is mixed with sodium chloride (15 grams) in a distillation flask. The mixture is then fractionally distilled to yield a light colored clear product (300 grams) comprising phenyltrichlorosilane (B. P. 197–202 degrees C.).

*Example 7*

A crude mixture comprising phenyltrichlorosilane and about 13 grams of aluminum chloride is mixed with sodium chloride (10 grams) in a distillation flask. The mixture is then fractionally distilled to yield a light colored clear product (250 grams) comprising phenyltrichlorosilane (B. P. 197–202 degrees C.).

*Example 8*

A crude mixture comprising biphenyltrichlorosilane and about 23 grams of aluminum chloride is mixed with sodium chloride (10 grams) in a distillation flask. The mixture is then fractionally distilled to yield a light colored clear product (30 grams) comprising biphenyltrichlorosilane (B. P. 190–210 degrees C. at 20 mm. Hg.).

*Example 9*

A sample comprising crude phenyltrichlorosilane and about 5 per cent by weight of aluminum chloride is concentrated by distilling off materials (such as benzene) boiling at temperatures up to 180 degrees C. A portion (100 grams) of the concentrated crude mixture is refluxed with sodium acetate (5 grams) in a one liter flask for one hour. The mixture is then fractionally distilled to yield a light colored clear product (65 grams) comprising phenyltrichlorosilane.

*Example 10*

A portion (100 grams) of the concentrated crude mixture obtained in Example 9 is refluxed with sodium sulfate (5 grams) in a one liter flask for one hour. The mixture is then fractionally distilled to yield a light colored clear product (65 grams) comprising phenyltrichlorosilane.

*Example 11*

Diethyl ether (8 grams) is dissolved in benzene (930 grams) and to this mixture is added aluminum chloride (15 grams). This mixture and silicon tetrachloride (1360 grams) are pumped into an opening in the top of a stainless steel reactor which consists of a vertical cylinder approximately twenty inches in length having an internal diameter of about three inches, and which is maintained at the reaction temperature by means of electrical heating coils surrounding the length of the cylinder. The reactor is packed at the bottom with coarse rock salt (500 grams) and is filled to within a few inches of the top with an alloy (2800 grams) comprising about 80 per cent silicon and 20 per cent iron and containing small amounts of aluminum (ground to not larger than 8 to 20 mesh). The mixture of reactants and catalyst is pumped into the reactor at the rate of about 35 grams per minute, the reaction temperature being 400 degrees C. and the pressure inside the reactor being 1000 pounds per square inch gauge. The product is collected in a receiver connected to a Dry Ice trap. At the conclusion of the run benzene (250 grams) is pumped through to rinse the reactor.

After removal from the reactor, the cooled liquid product (2260 grams) is mixed with sodium chloride (20 grams) and is then separated by fractional distillation through an electrically heated, jacketed glass column four feet in length, packed with single-turn glass helices and having a variable reflux head. After collecting the forerun (i. e., materials boiling in a range up to about 150 degrees C.) which comprises mainly unreacted silicon tetrachloride (760 grams) and benzene (720 grams), and an intermediate fraction (50 grams) boiling in the range between 150 and 195 degrees C., there is obtained substantially colorless phenyltrichlorosilane (408 grams). A black liquid residue (180 grams) remains in the flask after the distillation.

*Example 12*

The procedure described in the first paragraph of Example 11 is repeated, except that no rock salt is used in the reactor. The reactor is connected to the top of a salt pot, which is filled to a depth of about one foot with rock salt. The hot crude reaction mixture as it leaves the reactor is forced under pressure through the salt pot, from which it is collected in a receiver. As the liquid product in the receiver cools, a heavy black solid precipitates and the liquid is separated from the black solid by decantation. Three one hundred gram samples of the decanted liquid layer are mixed with no sodium chloride, 1 gram of sodium chloride and 2 grams of sodium chloride, respectively, and the samples are refluxed in a one liter flask for one hour, noting the maximum reflux temperature and the final reflux temperature. The samples are then distilled. The sample which comprises no sodium chloride has a maximum reflux temperature of 182 degrees C. and a final reflux temperature of 181 degrees C. Each of the other two samples has a constant maximum and final reflux temperature, the constant reflux temperature of the former sample being 191 degrees C.; the latter, 195 degrees C. The color (Hellige) of the distillate obtained from the sample with no sodium chloride is 15, whereas the color of the distillates from the samples containing sodium chloride is 3. Thus, it is evident that in this method not all of the aluminum halide is retained in the salt pot so that additional stabilizing agent in the still pot is necessary in order to obtain a light-colored distillate.

In the foregoing examples the products obtained are substantially free of aluminum halides and of decomposition products formed due to the presence of aluminum halides. Water white products may be obtained by redistilling the aromatic chlorosilanes from a trace of sodium chloride or sodium sulfate.

This is a continuation-in-part of application Serial No. 169,302, filed June 21, 1950, now abandoned and application Serial No. 210,160, filed February 9, 1951, now abandoned.

Having described the invention, I claim:

1. A method of minimizing the decomposition at elevated temperatures of an aromatic chlorosilane in admixture with an aluminum halide in which each halogen atom has an atomic weight between 35 and 80, comprising the step of contacting such mixture at an elevated temperature with a substance of the class consisting of sodium chloride and sodium sulfate.

2. A method as claimed in claim 1 wherein the amount of the sodium salt is at least the molar equivalent of the amount of the aluminum halide.

3. A method as claimed in claim 2 wherein the aluminum halide forms a complex with at least part of the sodium salt.

4. A method as claimed in claim 3 wherein the complex is formed in the presence of the aromatic chlorosilane.

5. A method as claimed in claim 1 wherein the contacting step is followed by the step of removing the aromatic chlorosilane in the form of a vapor from the sodium salt.

6. A method as claimed in claim 5 wherein the removal of the aromatic chlorosilane is accomplished by distillation from a liquid to leave the sodium salt in the distillation residue.

7. A method as claimed in claim 1 wherein the substance is sodium chloride.

8. A method of minimizing the decomposition at elevated temperatures of an aryltrichlorosilane whose molecule contains from six to seven carbon atoms in admixture with an aluminum halide in which each halogen atom has an atomic weight between 35 and 80, comprising the step of contacting such mixture at an elevated temperature with a substance of the class consisting of sodium chloride and sodium sulfate.

9. A method as claimed in claim 8 wherein the substance is sodium chloride.

10. A method of minimizing the decomposition at elevated temperatures of phenyltrichlorosilane in admixture with an aluminum halide in which each halogen atom has an atomic weight between 35 and 80, comprising the step of contacting such mixture at an elevated temperature with a substance of the class consisting of sodium chloride and sodium sulfate.

11. A method as claimed in claim 10 wherein the substance is sodium chloride.

12. A method as claimed in claim 1 wherein the aromatic chlorosilane is formed in the presence of the aluminum halide and the sodium salt.

13. A method as claimed in claim 12 wherein the aluminum halide and the sodium salt are present in a reactor in which the aromatic chlorosilane is formed.

References Cited in the file of this patent

UNITED STATES PATENTS

| | | |
|---|---|---|
| 2,576,448 | Daudt | Nov. 27, 1951 |
| 2,579,341 | Schwenker | Dec. 18, 1951 |